(12) United States Patent
De Rooij et al.

(10) Patent No.: US 9,634,555 B2
(45) Date of Patent: Apr. 25, 2017

(54) METHOD FOR OPERATING A NON-ISOLATED SWITCHING CONVERTER HAVING SYNCHRONOUS RECTIFICATION CAPABILITY SUITABLE FOR POWER FACTOR CORRECTION APPLICATIONS

(71) Applicant: Efficient Power Conversion Corporation, El Segundo, CA (US)

(72) Inventors: Michael A. De Rooij, Palm Springs, CA (US); Johan Strydom, Santa Clara, CA (US)

(73) Assignee: Efficient Power Conversion Corporation, El Segundo, CA (US)

( * ) Notice: Subject to any disclaimer, the term of this patent is extended or adjusted under 35 U.S.C. 154(b) by 108 days.

(21) Appl. No.: 14/383,868

(22) PCT Filed: May 30, 2013

(86) PCT No.: PCT/US2013/043315
§ 371 (c)(1),
(2) Date: Sep. 8, 2014

(87) PCT Pub. No.: WO2013/188119
PCT Pub. Date: Dec. 19, 2013

(65) Prior Publication Data
US 2015/0049528 A1    Feb. 19, 2015

Related U.S. Application Data

(60) Provisional application No. 61/659,217, filed on Jun. 13, 2012.

(51) Int. Cl.
*H02M 1/42* (2007.01)
*H02M 3/158* (2006.01)

(52) U.S. Cl.
CPC ....... *H02M 1/4208* (2013.01); *H02M 1/4225* (2013.01); *H02M 1/4233* (2013.01);
(Continued)

(58) Field of Classification Search
CPC ............. H02M 1/4208; H02M 1/4225; H02M 1/4233; H02M 3/1588; Y02B 70/126; Y02B 70/1466
See application file for complete search history.

(56) References Cited

U.S. PATENT DOCUMENTS 4,412,277 A    10/1983   Mitchell
6,269,012 B1 *  7/2001   Kusakabe ............. H02M 7/217
                                                    323/239
(Continued)

FOREIGN PATENT DOCUMENTS

TW    200643679 A    12/2006
TW    200950290 A    12/2009

*Primary Examiner* — Jessica Han
*Assistant Examiner* — Demetries A Gibson
(74) *Attorney, Agent, or Firm* — Blank Rome LLP

(57) ABSTRACT

A power factor correction (PFC) boost circuit. The PFC boost circuit can include a first switching device, a second switching device, a first gate driver coupled to the first switching device, a second gate driver coupled to the second switching device, and a PFC controller configured to control the first and second gate drivers. The PFC controller will utilize a new technique, referred to herein as "predictive diode emulation" to control the switching devices in a desired manner and to overcome inefficiencies and other problems that might arise using traditional diode emulation. The PFC controller is configured to operate in synchronous and non-synchronous modes.

10 Claims, 8 Drawing Sheets

(52) U.S. Cl.
CPC .......... *H02M 3/1588* (2013.01); *Y02B 70/126* (2013.01); *Y02B 70/1466* (2013.01)

(56) References Cited

U.S. PATENT DOCUMENTS

| | | | | |
|---|---|---|---|---|
| 6,768,655 B1 * | 7/2004 | Yang | ................... | H02M 1/4225 |
| | | | | 323/222 |
| 8,248,040 B2 * | 8/2012 | Rausch | ............... | H02M 1/4225 |
| | | | | 323/207 |
| 8,305,004 B2 * | 11/2012 | Shao | ................... | H02M 1/4225 |
| | | | | 315/209 R |
| 8,618,747 B2 * | 12/2013 | Park | ......................... | G05F 1/70 |
| | | | | 315/209 R |
| 8,929,110 B2 * | 1/2015 | Courtel | ................. | H02M 3/156 |
| | | | | 323/207 |
| 2004/0130923 A1 * | 7/2004 | Yin Ho | ................... | H02M 1/44 |
| | | | | 363/131 |
| 2005/0017695 A1 | 1/2005 | Stanley | | |
| 2005/0105311 A1 | 5/2005 | Soldano | | |
| 2006/0145674 A1 * | 7/2006 | Shelton | ............... | H02M 1/4225 |
| | | | | 323/282 |
| 2007/0008747 A1 | 1/2007 | Soldano et al. | | |
| 2008/0253151 A1 * | 10/2008 | Bahramian | ............. | H02M 1/08 |
| | | | | 363/22 |
| 2008/0278982 A1 | 11/2008 | Strijker | | |
| 2009/0237963 A1 | 9/2009 | Prasad et al. | | |
| 2009/0302816 A1 * | 12/2009 | Kunimatsu | ............. | H02M 1/36 |
| | | | | 323/282 |
| 2010/0266875 A1 * | 10/2010 | Somogye | ................... | G05F 1/10 |
| | | | | 429/7 |
| 2012/0008351 A1 | 1/2012 | Yonezawa et al. | | |
| 2012/0092910 A1 * | 4/2012 | Sugahara | ............ | H02M 1/4208 |
| | | | | 363/84 |

* cited by examiner

METHOD FOR OPERATING A NON-ISOLATED SWITCHING CONVERTER HAVING SYNCHRONOUS RECTIFICATION CAPABILITY SUITABLE FOR POWER FACTOR CORRECTION APPLICATIONS

BACKGROUND OF THE INVENTION

1. Field of the Invention

The present disclosure relates generally to power converters with synchronous rectification, and more particularly to methods and circuits for improving power converter efficiency.

2. Description of the Related Art

Rectifier circuits have many uses, notably as AC-to-DC power converters. Synchronous rectifier configurations aim to improve the power efficiency of power converters and have been widely adopted in low voltage (<40 V) converters.

Power factor correction (PFC) converters traditionally employ a boost converter with current wave shaping based on input voltage following. FIG. 1 depicts a traditional rectifier circuit including a power factor correction circuit. The PFC boost circuit 100 of FIG. 1 includes a PFC controller 125, gate driver 130, switch 135 and diode 140 to provide rectified voltage to a load 150. Other components illustrated in FIG. 1 include an AC main source 105, a mains voltage diode rectifier circuit 110, filter capacitor 115, inductor 120 and load capacitor 145. Diode 140 has high recovery losses compounded by the high switching frequency (typically 25-100 kHz). Many engineers have tried to design circuits that reduce the impact of reverse-recovery losses on the losses of the converter, but the resulting circuits add cost and complexity to the converter. Most PFC converters cannot absorb this cost and as such these ideas are not generally adopted.

The operation of the FIG. 1 rectifier circuit is primarily in the continuous conduction mode. As a result, operation will become discontinuous near the zero voltage crossing of the AC main source from which power is received due to insufficient voltage to generate sufficient inductor current for self commutation. Traditional PFC controllers 125 are designed to only drive a single switch, such as switch 135, and use a high frequency diode rectifier such as diode 140.

There is a desire for a power factor corrected rectifier that provides improved efficiency, without adding undesired cost and complexity. In addition, there is a desire for a power rectifier that reduces the impact of reverse-recovery losses.

SUMMARY OF THE INVENTION

In one embodiment, a power factor correction (PFC) boost circuit is provided. The PFC boost circuit can include a first switching device, a second switching device, wherein the first switching device is coupled with the second switching device in series, a first gate driver coupled to the first switching device, a second gate driver coupled to the second switching device, and a PFC controller configured to control the first and second gate drivers. The PFC controller will utilize a new technique, referred to herein as "predictive diode emulation" to control the switching devices in a desired manner and to overcome inefficiencies and other problems that might arise using traditional diode emulation. The PFC controller is configured to operate in synchronous and non-synchronous modes.

According to another embodiment, the first and second switching devices are GaN FET rectifier switches. Techniques are provided for using GaN FETs, or any device with a low reverse recovery charge (Qrr), to realize a synchronous rectifier PFC boost converter operating in the continuous current conduction mode with negative inductor current prevention or insufficient positive inductor current that allows full commutation of the switch to the bus voltage. This technique provides higher efficiency conversion PFC converters by reading input voltage, input current or controller compensation voltage and, if the value is above a pre-determined threshold, providing synchronous rectification to improve efficiency as diode function is then performed by the switch and not the diode. The switch having a much lower on-state voltage than the diode for the same operating conditions therefore yields lower conduction losses than the diode. With precise timing actual "diode" conduction time can be eliminated, thereby increasing efficiency further. The converter can also operate in the non-synchronous mode using the diode for rectification below the predetermined threshold; in this mode, the diode will not conduct as there is insufficient current to complete commutation or the current in the inductor would become negative and would therefore be blocked by the diode.

GaN offers a simple cost effective solution as it has no reverse-recovery losses when used as a synchronous rectifier. The goal is to achieve synchronous rectification without negative current in the inductor and prevent the rectifier switch from being turned on when there is insufficient energy to complete commutation. This is achieved by operating the boost converter rectifier with a synchronous rectifier (eGaN) operating in the continuous current mode and ensuring that there is sufficient voltage on the input to prevent negative inductor current (and/or currents too small to allow voltage commutation and resulting in diode conduction) and/or forced commutation. If the input voltage is too low, the synchronous rectifier switch is kept in the off state and permitted to operate as a diode. The threshold value of the voltage to switch between synchronous and non-synchronous operation is based on the load current and/or input voltage. The higher the load current, the lower the input voltage may be for synchronous operation. This technique offers a simple and cost effective solution to improve converter efficiency over traditional methods. Furthermore, eGaN FETs allow higher switching frequencies, thereby enabling the reduction of converter size.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
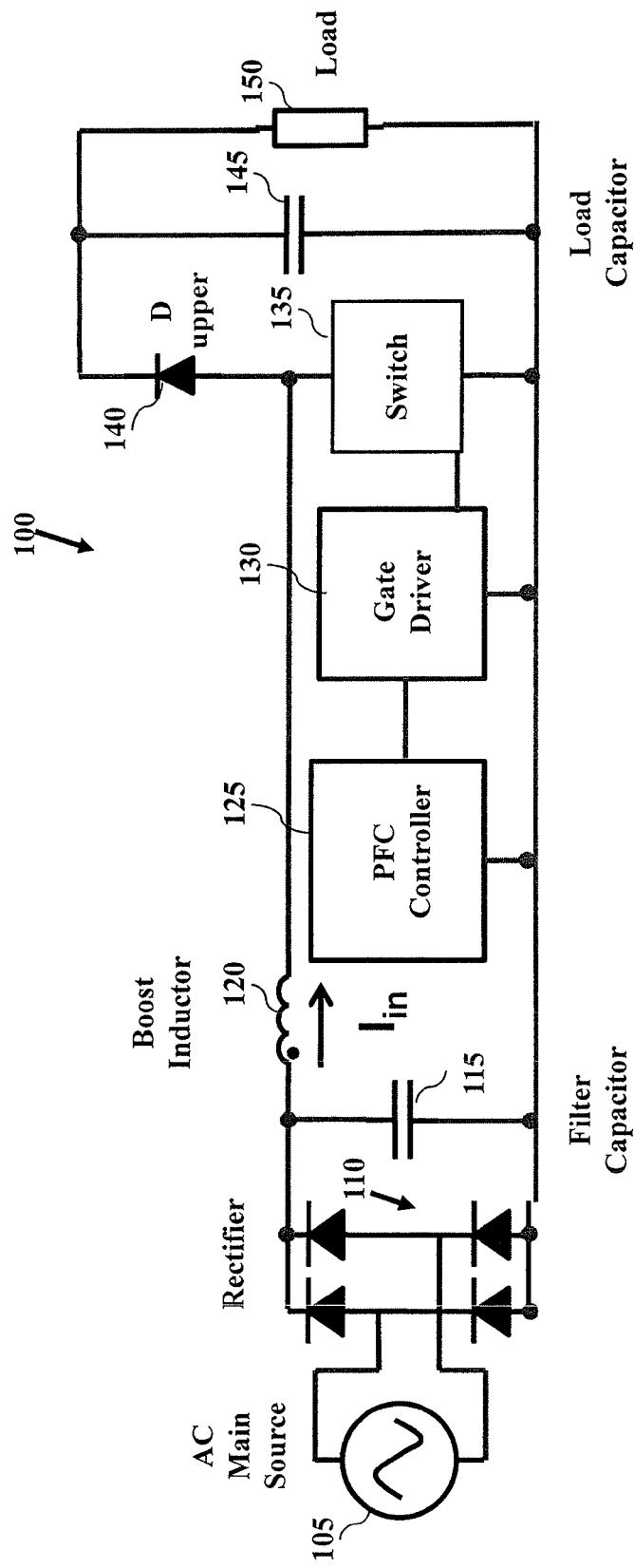
FIG. 1 depicts a traditional boost converter based power factor correction circuit.
Figure 2:
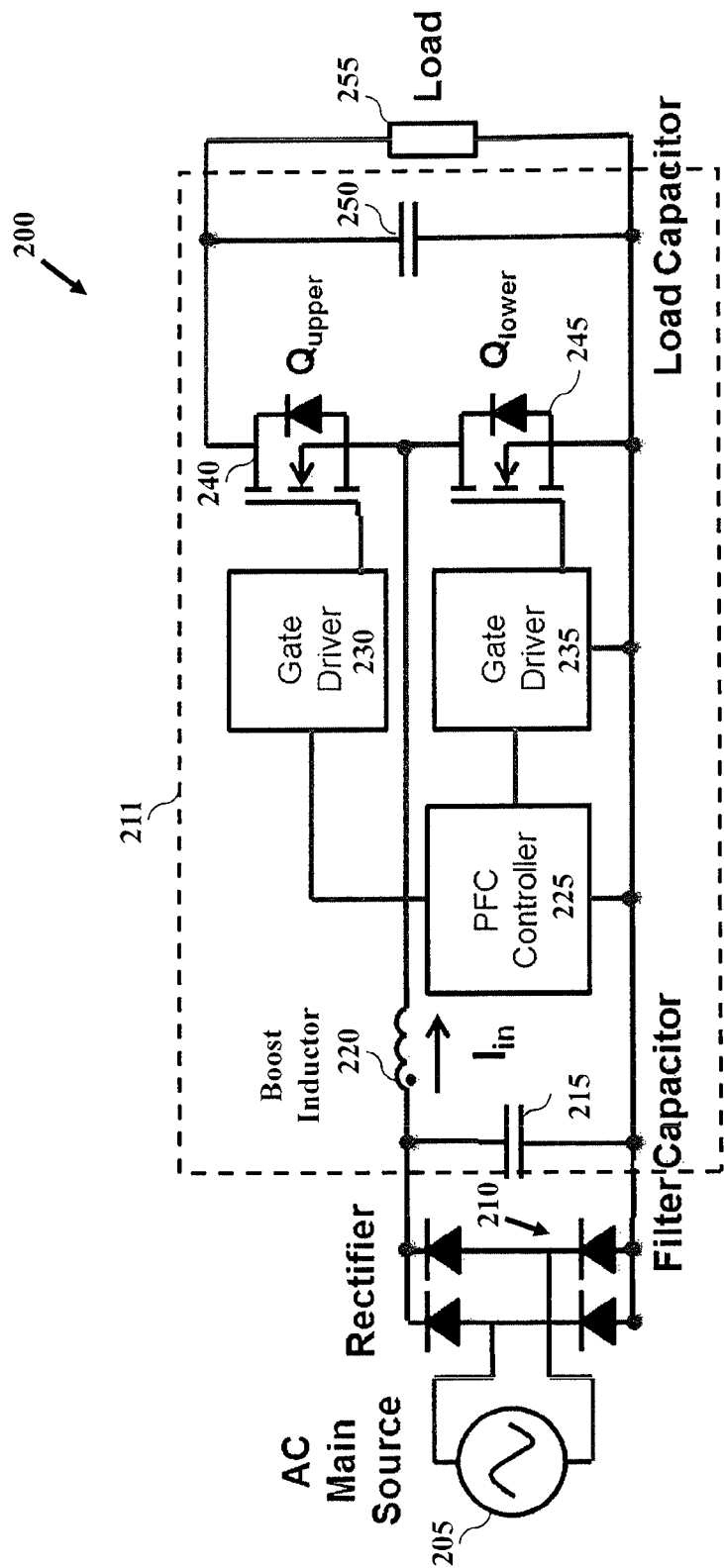
FIG. 2 depicts a synchronous rectifier boost power factor correction circuit according to one embodiment disclosed herein.

Referring now to the figures, FIG. 2 depicts a synchronous rectifier boost power factor correction circuit 200 according to one embodiment. The rectifier boost power factor correction circuit 200 includes rectifier circuit 210 and a boost circuit 211. Rectifier boost power factor correction circuit 200 may be coupled to an AC main source 205 to receive voltage and current, and will provide a converted voltage to load 255. The boost circuit 211 includes a filter capacitor 215, an inductor 220, a PFC controller 225, two gate drivers 230, 235, a Qupper switch 240, a Qlower switch 245, a load capacitor 250 and the load 255. In a desired embodiment, the Qupper and Qlower switches are GaN FET rectifier switches.

The AC main voltage is rectified by the rectifier circuit 210 and filtered by the small filter capacitor 215 to yield a full wave rectified sine-wave voltage, which serves as the source to the boost circuit 211. The inductor current $I_{in}$ is charged linearly when Qlower switch 245 is turned on by gate driver 235 (using a signal controlled by the PFC controller 225). There are two ways for the PFC controller 225 to turn on the Qupper switch 240: (1) when the inductor current Iin has reached a sufficient value (as discussed above); or (2) when the switching voltage of the Qupper switch 240 is sufficient such that if the switch 240 where a diode, it would turn on. This approach will be referred to herein as a "predictive diode emulation (PDE)" because it predicts the proper time to turn on the switch 240. The disclosed predictive diode emulation is advantageous over traditional diode emulation because other signals are being used before turning on the "diode" whereas traditional diode emulation only relies on a switching voltage level and is thus susceptible to noise.

According to the disclosed embodiment, when Qlower switch 245 is turned off, the controller 225 will determine if there is sufficient energy stored in the inductor 220 for the inductor current $I_{in}$ to fully commutate to Qupper switch 240 allowing the inductor 220 to discharge into the load capacitor 250. This is determined when the Qlower switch 245 is in the off state; that is, when the threshold of the voltage across Qlower switch 245 exceeds a predetermined value and, within the period that Qlower is kept off, Qupper switch 240 is turned on. The controller 225 will then monitor the inductor current $I_{in}$ and, if the current becomes negative, will turn off Qupper switch 240 (similar to traditional diode operation emulation). A negative inductor current $I_{in}$ has the effect of increasing the filter capacitor 215 voltage as the rectifier circuit 210 will block the current from being injected into the main supply. The effect on the mains current will be distortion. As such, it will no longer be classified as a unity power factor.

Figure 3:
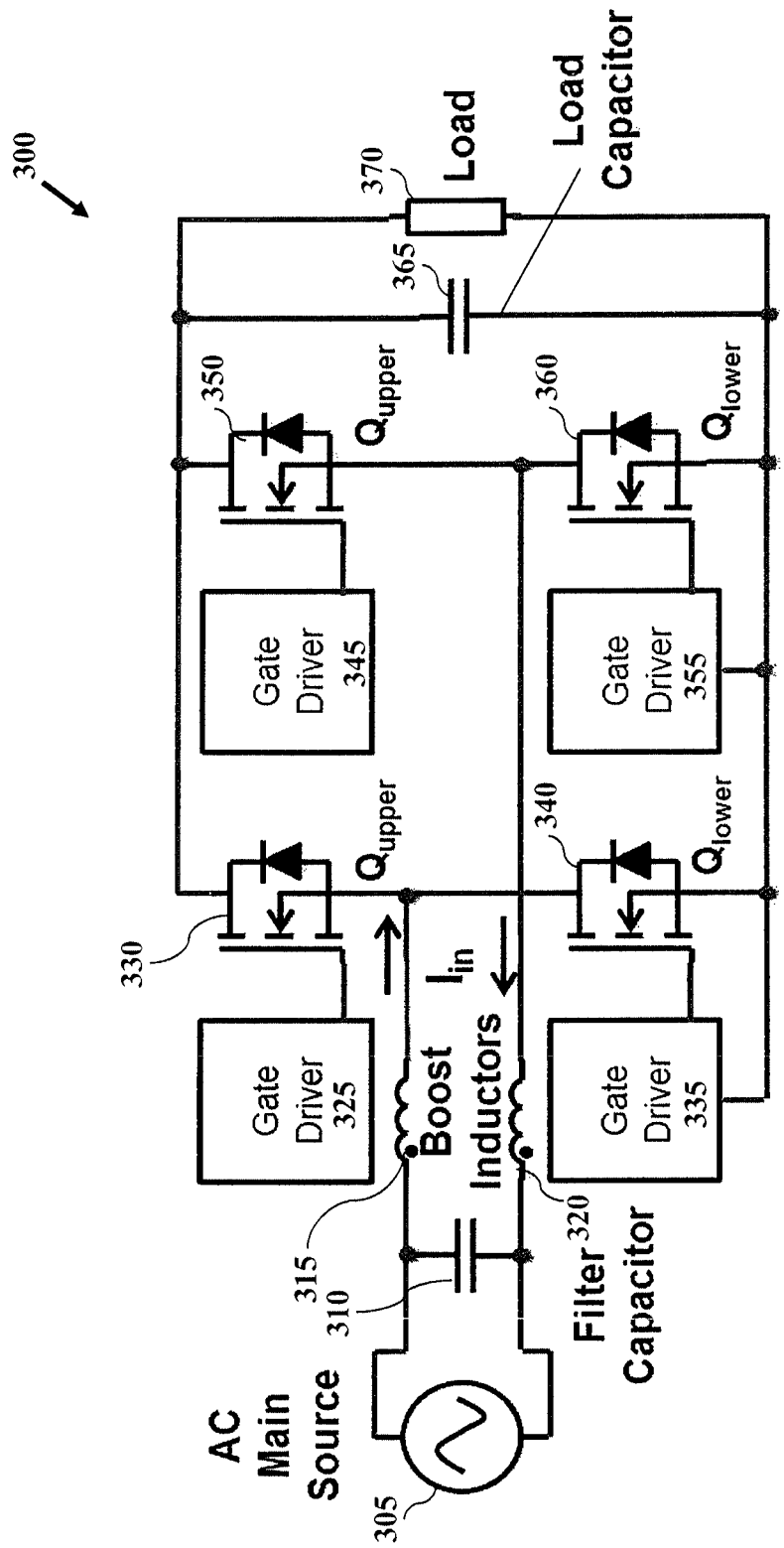
FIG. 3 depicts a synchronous rectifier boost power factor correction circuit according to another embodiment disclosed herein.

FIG. 3 depicts a synchronous rectifier boost power factor correction circuit 300 according to another embodiment disclosed herein. The rectifier boost power factor correction circuit 300 includes an AC main source 305, a filter capacitor 310, two boost inductors 315, 320, four switches 330, 340, 350, 360, four gate drivers 325, 335, 345, 355, a load capacitor 365 and a load 370. In a desired embodiment, the Qupper and Qlower switches are GaN FET rectifier switches. As can be seen, this embodiment does not have an AC mains rectifier such as the one illustrated in FIG. 2 (i.e., rectifier 210). A PFC controller is included, but not illustrated to keep FIG. 3 from being too cluttered. The PFC controller in this embodiment will also use the predictive diode emulation technique discussed above.

For the positive AC mains cycle, both the left and right Qlower switches 340, 360 will be turned on to charge both inductors 315, 320. When the left Qlower switch 340 is turned off, the controller will determine if there is sufficient energy stored in the inductors 315, 320 for the current $I_{in}$ to fully commutate to the left Qupper switch 330 allowing inductors 315, 320 to discharge into the load capacitor 365. This is determined when the threshold of the voltage across the left Qlower switch 340 exceeds a predetermined value and, within the period that the left Qlower switch 340 is kept off, the left Qupper switch 330 will be turned on. The controller will then monitor the current in the inductors 315, 320 and if the current becomes negative will turn off the left Qupper switch 330 (similar to traditional diode operation emulation). Unlike the circuit illustrated in FIG. 2, this circuit has the ability to inject the negative current into the mains supply thereby severely distorting the mains current and it will no longer be defined as unity power factor.

For the negative AC mains cycle, both the left and right Qlower switches 340, 360 will be turned on to charge both inductors 315, 320. When the right Qlower switch 360 is turned off, the controller will determine if there is sufficient energy stored in the inductors 315, 320 for the current $I_{in}$ to fully commutate to the right Qupper switch 350, allowing the inductor 315 to discharge into the load capacitor 365. This is determined when the threshold of the voltage across the right Qlower switch 360 exceeds a predetermined value and, within the period that the right Qlower switch 360 is kept off, the right Qupper switch 350 will be turned on. The controller will then monitor the current in the inductors and, if the current becomes negative, will turn off the right Qupper switch 350 (similar to traditional diode operation emulation). It should be appreciated that, for the illustrated circuit 300, it is possible for the charging switch to be either the upper set or the lower set (i.e., the lower and upper switches trade places in the above discussion).

Figure 4:
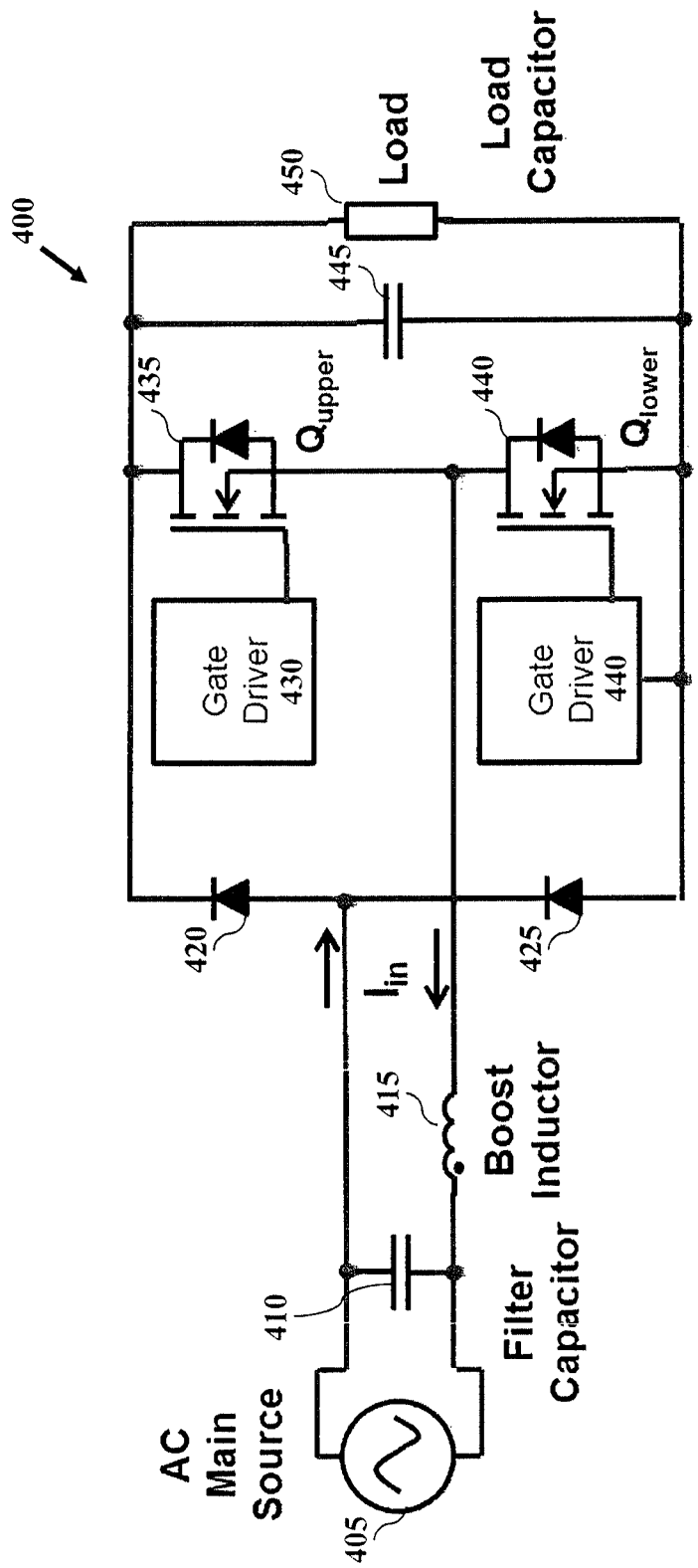
FIG. 4 depicts a synchronous rectifier boost power factor correction circuit according to another embodiment disclosed herein.

FIG. 4 depicts another synchronous rectifier boost power factor correction circuit 400 according to another embodiment. The rectifier boost power factor correction circuit 400 includes an AC main source 405, a filter capacitor 410, a boost inductor 415 two mains frequency diodes 420, 425, two gate drivers 430, 440, two switches 435,440, a load capacitor 445 and a load 450. In a desired embodiment, the Qupper and Qlower switches are GaN FET rectifier switches. A PFC controller is included, but not illustrated to keep FIG. 4 from being too cluttered. The PFC controller in this embodiment will also use the predictive diode emulation technique discussed above.

For the positive AC mains cycle the Qupper switch 435 will be turned on to charge the inductor 415 via the upper diode 420. When the Qupper switch 435 is turned off, the controller will determine if there is sufficient energy stored in the inductor 415 for the inductor current $I_{in}$ to fully commutate to the Qlower switch 440, allowing the inductor 415 to discharge into the load capacitor 445. This is determined when the threshold of the voltage across the Qupper switch 435 exceeds a predetermined value and, within the period that the Qupper switch 435 is kept off, the Qlower switch 440 will be turned on. The controller will then monitor the inductor current $I_{in}$ and, if the current becomes negative, will turn off the Qlower switch 440 (similar to traditional diode operation emulation). Unlike the circuit 200 illustrated in FIG. 2, the illustrated circuit 400 has the ability to inject the negative current into the mains supply 405, thereby severely distorting the mains current such that it will no longer be defined as unity power factor.

For the negative AC mains cycle, the Qlower switch 440 will be turned on to charge the inductor 415 via the lower diode 425. When the Qlower switch 440 is turned off, the controller will determine if there is sufficient energy stored in the inductor 415 for the inductor current $I_{in}$ to fully commutate to the Qupper switch 435, allowing the inductor 415 to discharge into the load capacitor 445. This is determined when the threshold of the voltage across the Qlower switch 440 exceeds a predetermined value and, within the period that the Qlower switch 440 is kept off, the Qupper switch 435 will be turned on. The controller will then monitor the inductor current and, if the current becomes negative, will turn off the Qupper switch 435 (similar to traditional diode operation emulation). It should be appreciated that circuit 400 has the least number of components for realizing the synchronous PFC boost circuit; as such, it is the preferred approach. This control approach can be used as an alternative control method for circuit 300 shown in FIG. 3.

Figure 5:
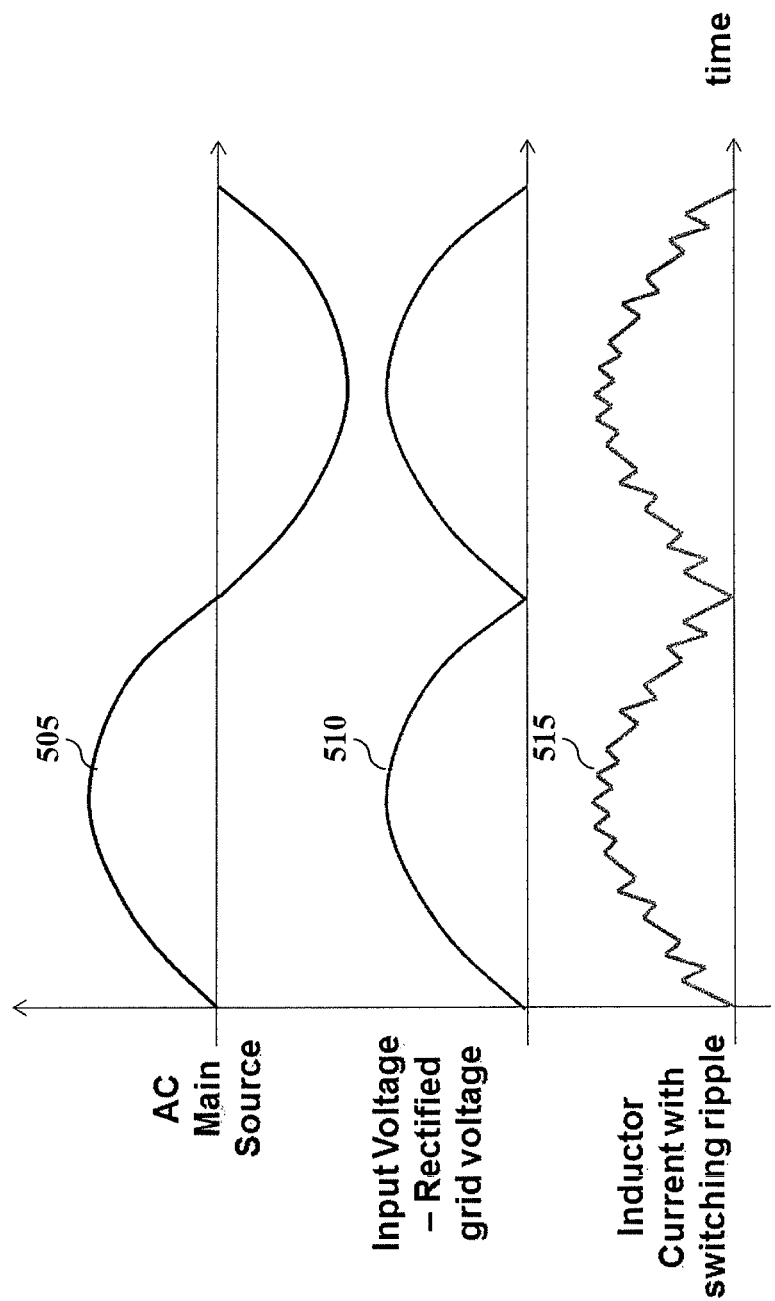
FIG. 5 depicts grid frequency waveforms.

FIG. 5 depicts grid frequency waveforms associated with the circuit 200 illustrated in FIG. 2. The upper waveform 505 shows the sinusoidal grid voltage, that when rectified by a full bridge diode rectifier yields the center voltage waveform 510. In traditional continuous current conduction mode PFC boost circuits, the current in the inductor (FIG. 2) will "follow" the shape of the rectified grid voltage 510. Since the circuit is switching i.e., constantly adjusting the inductor current by switching action, the resultant inductor current will have a high frequency ripple on it in addition to the low frequency rectified current 515.

Figure 6:
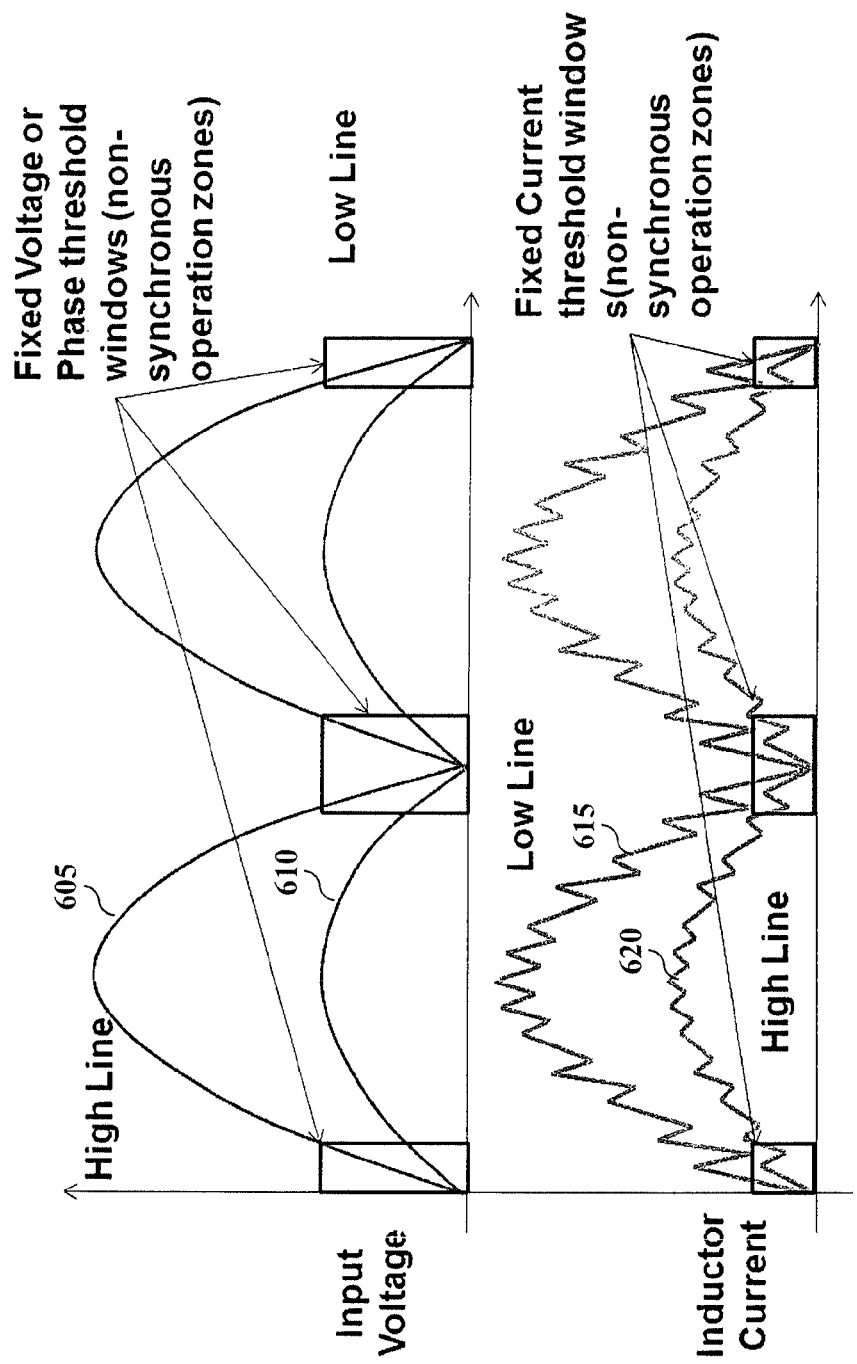
FIG. 6 depicts grid frequency waveforms illustrating the difference between high and low grid voltages.

FIG. 6 depicts grid frequency waveforms illustrating the difference between high and low grid voltages associated with the circuit 200 illustrated in FIG. 2. The upper waveforms 610, 605 show the rectified sinusoidal grid voltage for low line and high line conditions, respectively. Assuming the delivered power is fixed, then the corresponding current will be low for the high line case and high for the low line case. In traditional continuous current conduction mode PFC boost circuits, the current in the inductor (FIG. 2) will "follow" the shape of the rectified grid voltage. Since the circuit is switching i.e., constantly adjusting the inductor current by switching action, the resultant inductor current will have a high frequency ripple on it in addition to the low frequency rectified current (lower waveforms 615, 620).

The box windows (unnumbered) represent the period on the waveforms where the synchronous PFC boost converter will most-likely be operating in the non-synchronous mode, whereas the remainder of the waveform it will be operating in the synchronous mode.

Figure 7:
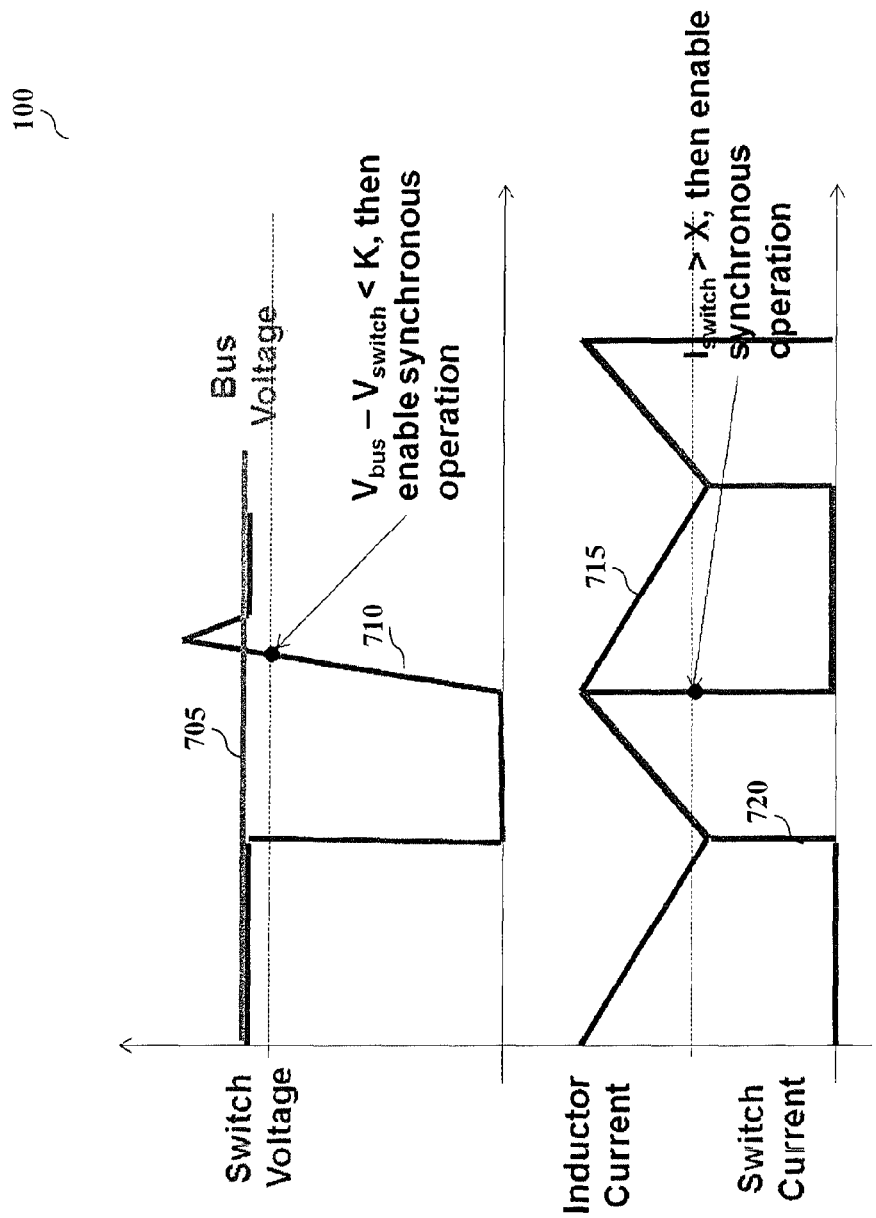
FIG. 7 depicts switching waveforms operating in a synchronous mode according to one or more embodiments disclosed herein.

FIG. 7 depicts switching waveforms operating in a synchronous mode according to one or more embodiments, specifically for the circuit 200 illustrated in FIG. 2. Waveform 710 represents the lower switch 245 voltage, waveform 720 represents the lower switch 245 current, waveform 715 represents the inductor 220 current, and waveform 705 represents the load capacitor 250 voltage. During the charging cycle, the switch 245 will be on, with corresponding near zero voltage across it, and the current will rise based on the inductor value and input voltage. When the lower switch turns off, the current 715 in the inductor 220 will cause the voltage 710 across the switch 245 to rise (commutation process) until it reaches the load capacitor voltage (bus voltage) where the diode (upper switch) will conduct. During synchronous operation, the upper switch will be turned on, thereby "replacing" the diode and allowing the inductor to discharge into the load capacitor. There will be some voltage overshoot associated with this process due to parasitic elements in a practical circuit. During synchronous operation, the inductor current will always be greater than zero, thereby preventing the circuit from operating with a negative current where energy can be transferred from the load back to the filter capacitor. It should be appreciated that the waveforms described herein with respect to FIG. 2 are also relevant to the circuits 300, 400 of FIGS. 3 and 4.

Figure 8:
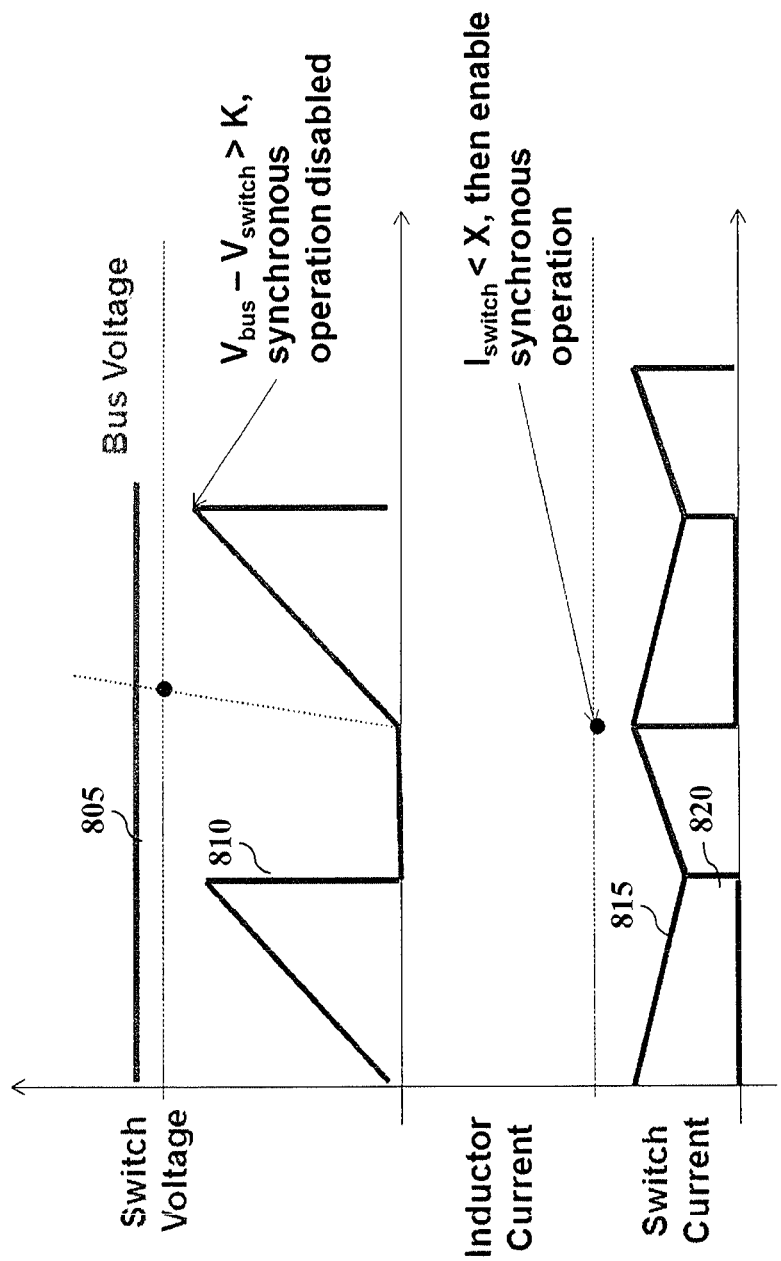
FIG. 8 depicts switching waveforms operating in a non-synchronous mode according to one or more embodiments disclosed herein.

FIG. 8 depicts switching waveforms operating in a non-synchronous mode according to one or more embodiments, specifically for the circuit 200 illustrated in FIG. 2. Waveform 810 represents the lower switch 245 voltage, waveform 820 represents the lower switch 245 current, waveform 815 represents the inductor 220 current, and waveform 805 represents the load capacitor 250 voltage. During the charging cycle, the switch 245 will be on, with corresponding near zero voltage across it, and the current will rise based on the inductor 220 value. When the lower switch 245 turns off, the current in the inductor 220 will cause the voltage across the switch 245 to rise (commutation process); however, there will be insufficient energy stored in the inductor 220 to raise the voltage across the switch 245 to the level of the load capacitor 250 voltage (bus voltage), thereby preventing any current from being discharged into the load capacitor and as such no energy will be transferred to the load capacitor. Under this condition, switch 240 will be controlled to remain off.

During non-synchronous operation, if the upper switch is turned on, with insufficient inductor current to achieve self-commutation and diode conduction, then forced commutation will occur which results in energy being taken from the load side and transferred to the supply side of the circuit with corresponding distortion in the mains current thereby loosing unity power factor operation. It is for this reason that the upper switch will be kept off during non-synchronous operation. It should be appreciated that the waveforms described herein with respect to FIG. 2 are also relevant to the circuits 300, 400 of FIGS. 3 and 4.

During non-synchronous operation, if the upper switch is turned on, then the circuit is capable of generating a negative inductor current where the source becomes the load capacitor 250 and the load becomes the filter capacitor 215. In this situation, the filter capacitor voltage will charge rapidly, due to its small value and, the diode rectifier will block current from being directed to the grid supply (PFC may only draw current from the grid and not source it) and will have the effect of distorting the desired grid current. It is for this reason that with upper switch will be kept off during non-synchronous operation. It should be appreciated that the waveforms described herein with respect to FIG. 2 are also relevant to the circuits 300, 400 of FIGS. 3 and 4.

Up until now the conditions for predictive turn on of the boost rectifier switch acting in place of a diode has been described (e.g., Qupper switch 240). Next, the conditions to determine when to turn off the diode emulating switch needs to be described in more detail. The FET switch can conduct current in both directions when in the on-state unlike the diode and as such it is possible to draw current from the output capacitor in the reverse direction (negative) and inject it back into the input circuit. This is undesirable as there are two scenarios that can occur: (1) (referring to FIG. 2) the input capacitor 215 is preceded by a mains grid diode rectifier 210 that will block the current and hence the voltage on the input capacitor 215 will rise, thereby distorting the input current drawn from the mains supply resulting in loss of the unity power factor; and (2) (referring to FIGS. 3 and 4) the negative current is injected into the mains grid with corresponding loss of unity power factor.

In a traditional diode emulation approach, the forward voltage drop across the diode is monitored and when it approaches zero it will trigger a turn off thereby emulating a diode. This approach is prone to noise in high voltage circuits due to the large differences in voltage between the on and off states. This is further aggravated when using eGaN FETs as the on state voltage is much lower than that of a typical fast switching diode.

The disclosed method (non-synchronous and synchronous) relies on the controller for current information. When the current drops below a predetermined threshold, turning on the FET switch 240 is inhibited (non-synchronous operation) and as such no determination for turn off is required. Even if diode conduction does occur with high on state voltage, the magnitude of the current will be low and the duration of conduction will be low, thereby still maintaining high efficiency.

During synchronous operation, a more precise point to turn off the FET switch relies on detecting the current in the rectifier switch. The current can be measured either directly in the switch or inferred indirectly by current measurement (either directly or indirectly) of the inductor or shunt in the system return path. When the magnitude of the current approaches zero, the switch will be turned off.

The disclosed method can best be summarized as 1) a precise turn-on and turn-off determination (both turn-on and turn-off points of the diode emulation switch is controlled and can be anywhere in the cycle and is dependent on 'diode' current); or 2) synchronous/non-synchronous operation. In this case, the diode emulating switch—if on—is on the whole time that the control switch (140/240 etc) is off (complementary switching)—no variation in the turn-off timing/device stays on/latched for remainder of cycle.

In both cases, the point of predictive diode emulating switch turn-on is determined as shown in FIGS. 7/8, or by using feedback parameters obtained from the controller as mentioned above. One aspect of the disclosed embodiments is that for PFC circuits, the converter must periodically (i.e., at twice the line frequency) oscillate between synchronous and non-synchronous operation, with non-synchronous operation occurring when the input voltage is close to the zero crossings (FIG. 6). Another aspect is the control of this transition between modes and how the diode emulation switch operates during the non-synchronous mode (referred to herein as "predictive diode emulation").

While this disclosure has been particularly shown and described with references to exemplary embodiments thereof, it will be understood by those skilled in the art that various changes in form and details may be made therein without departing from the scope of the embodiments encompassed by the appended claims.

The invention claimed is:

1. A synchronous rectifier power factor correction (PFC) boost circuit comprising:
   an upper switching device comprising an FET with a body diode having a low reverse recovery charge for operating as a synchronous rectifier in continuous conduction mode;
   a lower switching device comprising an FET with a body diode having a low reverse recovery charge for operating as a synchronous rectifier in continuous conduction mode;
   a first gate driver coupled to the upper switching device;
   a second gate driver coupled to the lower switching device;
   a boost inductor having an inductor current passing therethrough;
   a load capacitor; and
   a PFC controller configured to control the first and second gate drivers and the upper and the lower switching devices using predictive diode emulation, wherein the PFC controller monitors the inductor current and, when the inductor current decreases below a predetermined threshold indicating that there is insufficient energy stored in the boost inductor for the inductor current to fully commutate the upper switching device, the PFC controller turns off the upper switching device, the PFC controller also being configured to operate in synchronous and non-synchronous modes.

2. The PFC boost circuit of claim 1, wherein the upper and lower switching devices are GaN FET rectifier switches.

3. The PFC boost circuit of claim 2, wherein the GaN FET rectifier switches are operated in a synchronous manner.

4. The PFC boost circuit of claim 1, wherein the PFC controller is configured to detect switch modes between synchronous and non-synchronous operation based on zero crossing of received AC grid power.

5. The PFC boost circuit of claim 1, wherein the PFC controller is configured to detect switch modes based on one or more of main shunt current, input voltage, input voltage phase, controller compensation voltage, and switch voltage.

6. The PFC boost circuit of claim 1, wherein the PFC controller is configured to perform a boost operation based on at least one of peak inductor current and peak switch current as a set point.

7. The PFC boost circuit of claim 1, wherein the PFC controller is configured to perform a boost operation based on a closed loop compensation voltage set point.

8. The PFC boost circuit of claim 1, wherein the PFC controller is configured to perform a boost operation based on a fixed grid frequency phase set point.

9. The PFC boost circuit of claim 1, wherein the PFC controller is configured to perform a boost operation based on a fixed rectified supply voltage set point.

10. The PFC boost circuit of claim 1, wherein the circuit is configured to operate with a bridgeless rectifier configuration.

* * * * *